(12) United States Patent
Kulkarni et al.

(10) Patent No.: US 10,776,242 B2
(45) Date of Patent: Sep. 15, 2020

(54) COLLECTION OF SENSITIVE DATA—SUCH AS SOFTWARE USAGE DATA OR OTHER TELEMETRY DATA—OVER REPEATED COLLECTION CYCLES IN SATISFACTION OF PRIVACY GUARANTEES

(71) Applicant: Microsoft Technology Licensing, LLC, Redmond, WA (US)

(72) Inventors: Janardhan Dattatreya Kulkarni, Seattle, WA (US); Bolin Ding, Redmond, WA (US); Sergey Yekhanin, Redmond, WA (US); Joshua Allen, Redmond, WA (US); Alexander Norton Meade, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 252 days.

(21) Appl. No.: 15/665,261

(22) Filed: Jul. 31, 2017

(65) Prior Publication Data
US 2018/0189164 A1   Jul. 5, 2018

Related U.S. Application Data

(60) Provisional application No. 62/442,927, filed on Jan. 5, 2017.

(51) Int. Cl.
*G06F 11/34*      (2006.01)
*G06F 11/30*      (2006.01)
(Continued)

(52) U.S. Cl.
CPC ...... *G06F 11/3438* (2013.01); *G06F 11/3089* (2013.01); *G06F 21/6245* (2013.01); *G06F 16/285* (2019.01)

(58) Field of Classification Search
CPC ............. G06F 11/3438; G06F 11/3089; G06F 21/6245
See application file for complete search history.

(56) References Cited

U.S. PATENT DOCUMENTS 8,555,400 B2   10/2013   Shi et al.
8,893,292 B2   11/2014   Wang et al.
(Continued)

OTHER PUBLICATIONS

Fanti et al., Building a RAPPOR with the Unknown: Privacy-Preserving Learning of Associations and Data Dictionaries Proceedings on Privacy Enhancing Technologies; DOI 10.1515/popets-2016-0015 Date:Nov. 30, 2015, pp. 41-61 (Year: 2015).*
(Continued)

*Primary Examiner* — Harunur Rashid
(74) *Attorney, Agent, or Firm* — NovoTechIP International PLLC

(57) ABSTRACT

A facility for reporting on original values on behalf of each of a plurality of users—each falling within a domain partitioned into a plurality of segments of uniform size—is provided. For each of the plurality of users, the facility (a) randomly selects an upward-rounding window size that is smaller than the segment size; (b) for each source value in a domain, randomly determines a mapping of each segment of the domain to a segment identifier value; (c) determines an original value for the user; (d) adds the upward-rounding window size to the user's original value to obtain a window-augmented original value; (e) identifies a segment containing the window-augmented original value; (f) identifies a segment identifier value mapped-to from the identified segment using the determined mapping; and (g) transmits a reporting communication on the user's behalf reporting a value based on the identified segment identifier value.

18 Claims, 3 Drawing Sheets

(51) Int. Cl.
*G06F 21/62* (2013.01)
*G06F 16/28* (2019.01)

(56) References Cited

U.S. PATENT DOCUMENTS

2007/0124268 A1* 5/2007 Dwork ............... G06F 21/6227
2012/0266218 A1 10/2012 Mattsson
2014/0196151 A1 7/2014 Mishra et al.

OTHER PUBLICATIONS

Wang, et al., "Using Randomized Response for Differential Privacy Preserving Data Collection", In Proceedings of Workshops of the EDBT/ICDT Joint Conference, Mar. 15, 2016, 8 pages.

Krishnan, et al., "PrivateClean: Data Cleaning and Differential Privacy", In Proceedings of International Conference on Management of Data, Jun. 26, 2016, pp. 937-951.

Rastogi, et al., "Differentially Private Aggregation of Distributed Time-Series with Transformation and Encryption", In Technical Report MSR-TR-2009-165, Nov. 1, 2009, pp. 1-25.

Greenberg, Andy, "Apple's 'Differential Privacy' Is About Collecting Your Data—But Not ?Your Data", https://www.wired.com/2016/06/apples-differential-privacy-collecting-data/, Published on: Jun. 13, 2016, 4 pages.

Kellaris, et al., "Practical Differential Privacy via Grouping and Smoothing", In Proceedings of 39th International Conference on Very Large Data Bases Endowment, vol. 6, Issue 5, Mar. 2013, pp. 301-312.

Xiao, et al., "Personalized Privacy Preservation", In Proceedings of ACM SIGMOD International Conference on Management of Data, Jun. 27, 2006, pp. 229-240.

Fan, et al., "A Practical Framework for Privacy-Preserving Data Analytics", In Proceedings of International World Wide Web Conference, May 18, 2015, pp. 311-321.

Acharya, et al., "Fast and Near-Optimal Algorithms for Approximating Distributions by Histograms", In Proceedings of 34th ACM SIGMOD-SIGACT-SIGAI Symposium on Principles of Database Systems, May 31, 2015, pp. 249-263.

Ding, et al., "Sample + Seek: Approximating Aggregates with Distribution Precision Guarantee", In Proceedings of International Conference on Management of Data, Jun. 26, 2016, pp. 679-694.

Goemans, Michel, "Chernoff bounds, and some applications", http://math.mit.edu/~goemans/18310S15/chernoff-notes.pdf, Published on: Feb. 21, 2015, 6 pages.

Roth, Aaron, "New Algorithms for Preserving Differential Privacy", In Thesis CMU-CS-10-135 of Carnegie Mellon University, Jul. 2010, 139 pages.

* cited by examiner

COLLECTION OF SENSITIVE DATA—SUCH AS SOFTWARE USAGE DATA OR OTHER TELEMETRY DATA—OVER REPEATED COLLECTION CYCLES IN SATISFACTION OF PRIVACY GUARANTEES

CROSS-REFERENCE TO RELATED APPLICATIONS

This application claims the benefit of U.S. Provisional Patent Application No. 62/442,927, filed on Jan. 5, 2017, which is hereby incorporated by reference in its entirety.

BACKGROUND

"Telemetry data" refers to collecting information describing the operation of a remote system, and transmitting it to a central point for analysis and/or long-term storage. The systems whose operation telemetry data describes can be of a variety of types, including hardware systems and software systems. For example, telemetry data for an access control door hardware system may include the number of times the door was unlocked during a particular time period. The telemetry data for a software system may reflect the number of times an operating system was booted or an application was launched during a particular time period, or the portion of that period of time for which the operating system or app was running.

SUMMARY

This summary is provided to introduce a selection of concepts in a simplified form that are further described below in the Detailed Description. This summary is not intended to identify key factors or essential features of the claimed subject matter, nor is it intended to be used to limit the scope of the claimed subject matter.

A facility for reporting on one or more original values on behalf of each of a plurality of users—each original value falling within a domain partitioned into a plurality of segments of uniform size—is provided. For each of the plurality of users, the facility (a) randomly selects an upward-rounding window size that is smaller than the segment size; (b) for each source value in a domain, randomly determines a mapping of each segment of the domain to a segment identifier value; (c) determines an original value for the user; (d) adds the upward-rounding window size to the original value determined for the user to obtain a window-augmented original value; (e) identifies a segment containing the window-augmented original value; (f) uses the determined mapping to identify a segment identifier value mapped-to from the identified segment; and (g) transmits a reporting communication on behalf of the user that reports a value based at least in part on the identified segment identifier value.

DETAILED DESCRIPTION

1. Problem Statement

Figure 1:
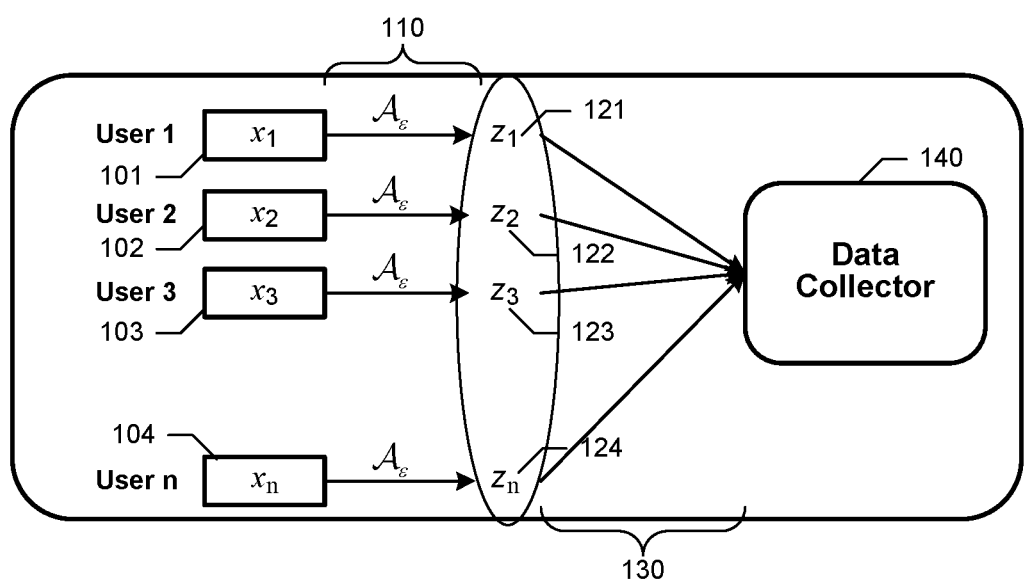
FIG. 1 is a data flow diagram showing private data collection performed using a local model of differential privacy.

Differential privacy (DP) is a mechanism for enforcing privacy guarantees against the collection of private data. In the context of telemetry collection, it is common to use algorithms that exhibit differential privacy in the local model, also sometimes called randomized response model, $\gamma$-amplification, or FRAPP. FIG. 1 is a data flow diagram showing private data collection performed using a local model of differential privacy. Randomized algorithms $\mathcal{A}_\varepsilon$ 110 are invoked on each user's device to turn user's private value $x_i$ 101-104 into a response $z_i$ 121-124 that is communicated 130 to a data collector—such as via the Internet or another network. The randomized algorithms have the property that the likelihood of any specific algorithm's output varies little with the input, thus providing users with plausible deniability. Guarantees offered by locally differentially private algorithms, though very strong in a single round of telemetry collection, quickly degrade when data is collected over time. This is a very challenging problem that limits the applicability of DP in many contexts.

In telemetry applications, privacy guarantees typically need to hold in the face of continuous data collection. Ú. Erlingsson, V. Pihur, and A. Korolova. RAPPOR: randomized aggregatable privacy-preserving ordinal response; in CCS, pages 1054-1067, 2014, proposed a framework based on "memoization" to tackle this issue. Erlingsson's techniques allow one to extend single round DP algorithms to continual data collection and protect users whose values stay constant or change very rarely. The key limitation of Erlingsson is that its approach cannot allow for even very small but frequent changes in users' private values, making it inappropriate for collecting counter data.

To overcome these deficiencies of conventional approaches to enforcing a specified level of privacy in data collection, the inventors have conceived and reduced to practice a software and/or hardware facility (the "facility") that provides mechanisms with formal privacy guarantees in the face of continuous collection of counter data. These guarantees are particularly strong when users' behavior remains approximately the same, varies slowly, or varies around a small number of values over the course of data collection.

In some examples, the facility uses simple 1-bit response mechanisms in the local model of DP for single-round collection of counter data for mean and histogram estimation.

In some examples, the facility uses a rounding technique called "$\alpha$-point rounding" that allows memoization to be applied in the context of private collection of counters while avoiding substantial losses in accuracy or privacy. The facility provides rigorously defined privacy guarantees when the data is collected continuously for an arbitrarily long period of time.

1.1 Preliminaries and Problem Formulation

Figure 2:
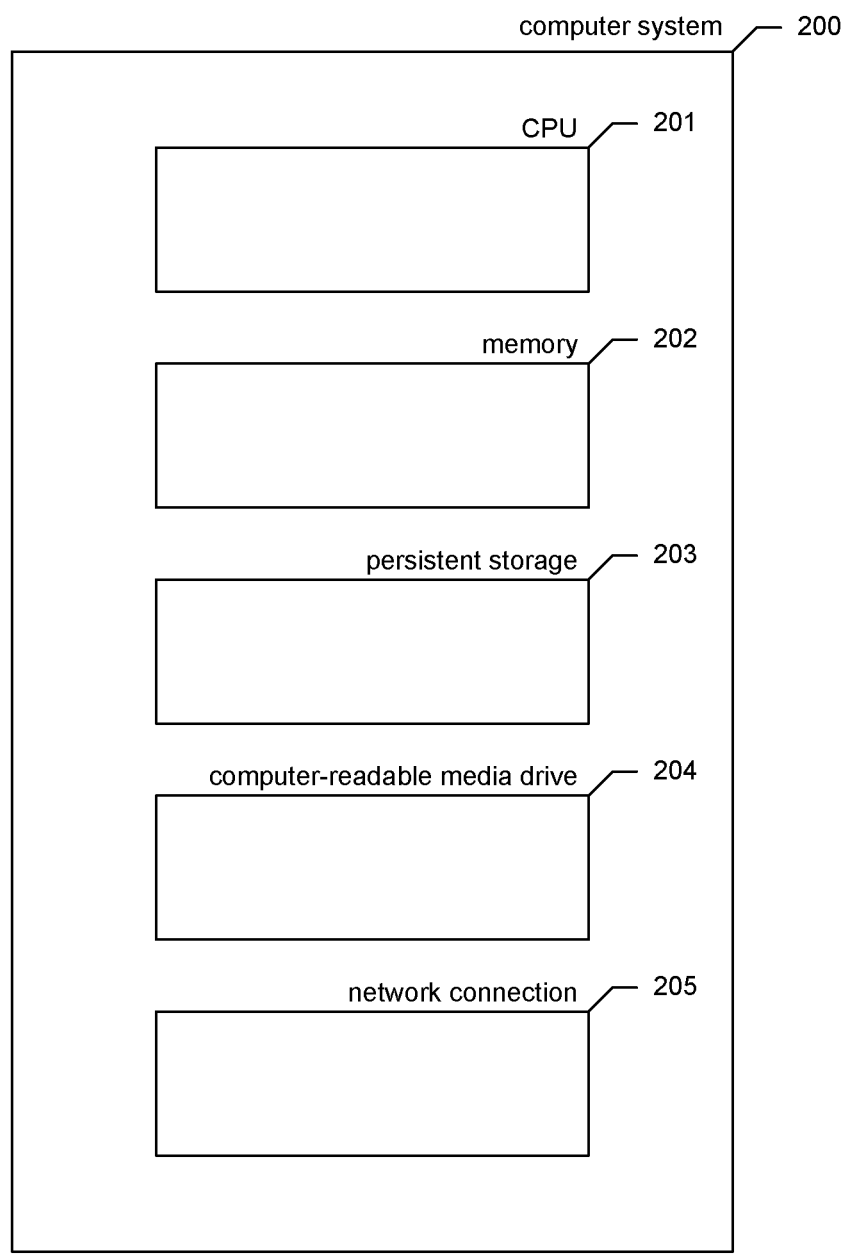
FIG. 2 is a block diagram showing some of the components typically incorporated in at least some of the computer systems and other devices on which the facility operates.

FIG. 2 is a block diagram showing some of the components typically incorporated in at least some of the computer systems and other devices on which the facility operates. In various embodiments, these computer systems and other devices 100 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit ("CPU") 201 for executing computer programs; a computer memory 202 for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

In some cases, the facility operates in an environment in which there are n users, and each user i at time t has a private (integer or real) counter with value $x_i(t) \in [0,m]$. A data collector collects these counter values $\{x_i(t)\}_{i \in [n]}$ at each time stamp t to do statistical analysis, such as by applying mean, median, maximum, and/or other aggregation functions. For telemetry analysis, for example, understanding the mean and the distribution of counter values (e.g., app usage) can be very important to IT companies.

Local model of differential privacy (LDP). In some cases, users require formal privacy guarantees before they are willing to communicate their values to the data collector. Hence, a DP model that first collects all users' data and then injects noise in the analysis step, is not applicable in our setup. In this work, we adopt the local model of differential privacy, where each user randomizes private data using a randomized algorithm (mechanism) $\mathcal{A}$ locally before sending it to data collector.

Definition 1. A randomized algorithm $\mathcal{A}: \mathcal{V} \rightarrow \mathcal{Z}$ is ε-locally differentially private (ε-LDP) if for any pair of values v, v'∈$\mathcal{V}$ and any subset of output $\mathcal{S} \in \mathcal{Z}$, we have that $$Pr[\mathcal{A}(v) \in S] \leq e^\varepsilon \cdot Pr[\mathcal{A}(v') \in S] \quad (1)$$

LDP formalizes a type of plausible deniability: no matter what output is released, it is approximately equally as likely to have come from one point v∈$\mathcal{V}$ as any other.

Statistical Estimation Problems.

In various examples, the facility is focused on two estimation problems:

Mean estimation: For each time stamp t, the data collector obtains an estimation $\hat{\sigma}(t)$ for $$\sigma(\vec{x}_t) = \frac{1}{n} \cdot \sum_{i \in [n]} x_i(t).$$

The error of an estimation algorithm for mean is defined to be $\max_{\vec{x}_t \in [m]^n} |\hat{\sigma}(\vec{x}_t) - \sigma(\vec{x}_t)|$—in other words, a worst case analysis. We use σ(t) to mean $\sigma(\vec{x}_t)$ for a fixed input $\vec{x}_t$.

Histogram estimation: Suppose the domain of counter values is partitioned into k buckets (e.g., with equal widths), and that a counter value $x_i(t) \in [0,m]$ can be mapped to a bucket number $v_i(t) \in [k]$. For each time stamp t, the data collector estimates frequency of $$v \in [k] : h_t(v) = \frac{1}{n} \cdot |\{i : v_i(t) = v\}| \text{ as } \hat{h}_t(v).$$

The error of a histogram estimation is measured by $\max_{v \in [k]} |\hat{h}(v) - h_t(v)|$. Again, this reflects a worst case analysis.

1.2 Repeated Collection and Overview of Privacy Framework

Privacy Leakage in Repeated Data Collection.

Although LDP is a very strict notion of privacy, its effectiveness decreases if the data is collected repeatedly. If counter values of a user i are collected for T time stamps by executing an ε-LDP mechanism $\mathcal{A}$ independently on each time stamp, $x_i(1) \, x_i(2) \ldots x_i(T)$ can be only guaranteed indistinguishable to another sequence of counter values, $x_i'(1) \, x_i'(2) \ldots x_i'(T)$, by a factor of up to $e^{T \cdot \varepsilon}$, which may in some cases be regarded as too large to be reasonable as T increases.

Hence, in applications such as telemetry, where data is collected periodically or continuously, privacy guarantees provided by an LDP mechanism for a single round of data collection are often not sufficient. A formalized privacy guarantee to enhance LDP for repeated data collection is described below in Section 3. Intuitively, the facility ensures that every user blends with a large set of other users who have very different behaviors.

Framework Overview.

In some examples, the facility operates in accordance with a framework for mean and histogram estimation that has four main components:

- 1-bit mechanisms that provide local ε-LDP guarantees and good accuracy for a single round of data collection are described in Section 2.
- An α-point rounding scheme to randomly discretize users private values prior to applying memoization to conceal small changes, while keeping the expectation of discretized values intact is described in Section 3.
- Memoization of discretized values using the 1-bit mechanisms to avoid privacy leakage from repeated data collection is described in Section 3.
- Output perturbation (also known as "instantaneous noise") to protect exposing the transition points due to large changes in user's behavior and attacks based on auxiliary information is described in Section 4.

Figure 3:
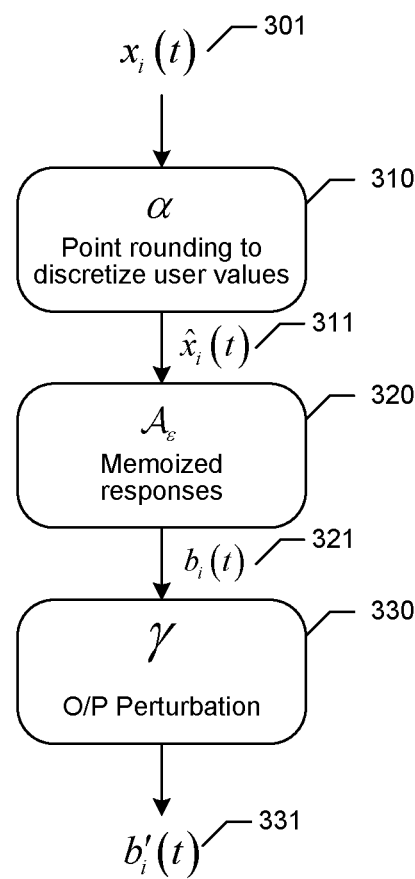
FIG. 3 is a flow diagram showing a process performed by the facility in some examples to transform a user's private values into the response that is communicated to the data collector for the user.

FIG. 3 is a flow diagram showing a process performed by the facility in some examples to transform a user's private values into the response that is communicated to the data collector for the user. The facility begins with user i's private value x for time t, $x_i(t)$ 301. The facility subjects value 301 to an α-point rounding scheme 310 to randomly discretize users private values prior to applying memoization to conceal small changes, while keeping the expectation of discretized values intact. This produces a rounded value $\hat{x}_i(t)$ 311. To value 311, the facility performs memoization 320 using the 1-bit mechanisms to avoid privacy leakage from repeated data collection to obtain memorized value $b_i(t)$ 321. The facility subjects value 320 to output perturbation 330 to obtain perturbed value $b_i'(t)$ 331, which the facility communicates as value $z_i$ to the data collector.

Those skilled in the art will appreciate that the acts shown in FIG. 2 may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

2. Single-Round LDP Mechanisms for Mean and Histogram Estimation

We first describe our 1-bit LDP approach to mean and histogram estimation. This approach is applied to single-bit counters each supplied by a single user. Some aspect of this 1-bit LDP approach are based on one or more of J. C. Duchi, M. J. Wainwright, and M. I. Jordan, Local privacy and minimax bounds, Sharp rates for probability estimation, in *NIPS*, pages 1529-1537, 2013; J. C. Duchi, M. I. Jordan, and M. J. Wainwright, Local privacy and statistical minimax rates, in *FOCS*, pages 429-438, 2013; J. C. Duchi, M. J. Wainwright, and M. I. Jordan, Minimax optimal procedures for locally private estimation, in CoRR, abs/1604.02390, 2016; and R. Bassily and A. D. Smith, Local, private, efficient protocols for succinct histograms, in *STOC*, pages 127-135, 2015.

2.1 1-Bit Mechanism for Mean Estimation

Collection Mechanism.

1 BitMean: When the collection of counter $x_i(t)$ at time t is requested by the data collector, each user i (that is, the computing device operating on behalf of user i) sends one bit $b_i(t)$, which is independently drawn from the distribution:

$$b_i(t) = \begin{cases} 1, \text{ with probablity } \frac{1}{e^\varepsilon + 1} + \frac{x_i(t)}{m} \cdot \frac{e^\varepsilon - 1}{e^\varepsilon + 1}; \\ 0, \text{ otherwise.} \end{cases} \quad (2)$$

Mean Estimation.

Data collector obtains the bits $\{b_i(t)\}_{i \in [n]}$ sent by n users and estimates $\sigma(t)$ as $$\hat{\sigma}(t) = \frac{m}{n} \sum_{i=1}^{n} \frac{b_i(t) \cdot (e^\varepsilon + 1) - 1}{e^\varepsilon - 1}. \quad (3)$$

For the 1-dimensional mean estimation, Laplace mechanism is asymptotically optimal for the mini-max error. However, the communication cost per user in Laplace mechanism is $\Omega(\log m)$ bits, and our experiments show it also leads to larger error compared to our 1-bit mechanism. We prove following results for the above 1-bit mechanism.

Theorem 1.

For single-round data collection, the mechanism 1 BitMean in (2) preserves $\varepsilon$-LDP for each user. Upon receiving the n bits $\{b_i(t)\}_{i \in [n]}$, the data collector can then estimate mean of counters from n users as $\hat{\sigma}(t)$ in (3). With probability at least $1 - \delta$, we have $$|\hat{\sigma}(t) - \sigma(t)| \leq \frac{m}{\sqrt{2n}} \cdot \frac{e^\varepsilon + 1}{e^\varepsilon - 1} \cdot \sqrt{\log \frac{2}{\delta}}.$$

2.1A Proof of Theorem 1

Theorem 2.1.

The algorithm 1 BitMean is $\varepsilon$-DP of every user.

Proof.

Observe that each user contributes only a single bit $b_i$ to data collector. By formula (11) the probability that $b_i=0$ varies from $$\frac{1}{e^\varepsilon + 1} \text{ to } \frac{e^\varepsilon}{e^\varepsilon + 1}$$

depending on the private value $x_i$. Similarly, the probability that $b_i=1$ varies from $$\frac{1}{e^\varepsilon + 1} \text{ to } \frac{e^\varepsilon}{e^\varepsilon + 1}$$

with $x_i$. Thus the ratios of respective probabilities for different values of $x_i$ can be at most $e^\varepsilon$.

Recall the definition of $\hat{\sigma}$.

$$\sigma = \frac{1}{n} \sum_i x_i \quad (4)$$

Lemma 3.

$\hat{\sigma}(t)$ in Equation (3) is an unbiased estimator for $\sigma$.

Proof.

Observe that $$E[\hat{\sigma}(t)] = \frac{m}{n} \cdot \frac{e^\varepsilon + 1}{e^\varepsilon - 1} \cdot \left( \sum_{i \in [n]} E[b_i(t)] - \frac{n}{e^\varepsilon + 1} \right)$$

$$= \frac{m}{n} \cdot \frac{e^\varepsilon + 1}{e^\varepsilon - 1} \cdot \left( \sum_{i \in [n]} \frac{x_i(t)}{m} \cdot \frac{e^\varepsilon - 1}{e^\varepsilon + 1} \right)$$

$$= \sigma(t)$$

Lemma 4.

Let $\hat{\sigma}(t)$ and $\sigma$ be as in Equations (3, 4). Let $\theta \in (0,1)$ be arbitrary.

$$Pr[|\hat{\sigma}(t) - \sigma(t)| \geq \delta m] \leq 2 \cdot e^{-2\delta^2 \cdot n \cdot \left(\frac{e^\varepsilon - 1}{e^\varepsilon + 1}\right)^2}. \quad (5)$$

Proof.

Clearly, for every $i \in [n]$, $$E[b_i(t)] = \frac{1}{e^\varepsilon + 1} + \frac{x_i(t)}{m} \cdot \frac{e^\varepsilon - 1}{e^\varepsilon + 1}.$$

Let $$\mu = E\left(\sum_{i\in[n]} b_i(t)\right) = \frac{n}{e^\varepsilon+1} + \frac{n\sigma(t)}{m} \cdot \frac{e^\varepsilon-1}{e^\varepsilon+1}. \quad (6)$$

Applying the Chernoff-Hoeffding bound to independent $\{0,1\}$-random variables $\{b_i(t)\}_{i\in n}$, for all $t>0$, $$Pr\left[\left|\sum_{i\in[n]} b_i(t) - \mu\right| \geq t\right] \leq 2 \cdot e^{-\frac{2t^2}{n}}. \quad (7)$$

Combining (7) and (6) produces $$Pr\left[\left|\sum_{i\in[n]} b_i(t) - \frac{n}{e^\varepsilon+1} - \frac{n\sigma}{m}\cdot\frac{e^\varepsilon-1}{e^\varepsilon+1}\right| \geq t\right] \leq e^{-\frac{2t^2}{n}}. \quad (8)$$

Combining (8), (4), and (3) produces $$Pr\left[|\hat\sigma(t) - \sigma(t)| \geq t\cdot\frac{m}{n}\cdot\frac{e^\varepsilon+1}{e^\varepsilon-1}\right] \leq 2\cdot e^{-\frac{2t^2}{n}}. \quad (9)$$

Thus setting $$t = \theta n \cdot \frac{e^\varepsilon-1}{e^\varepsilon+1},$$

we obtain $$Pr[|\hat\sigma(t)-\sigma(t)| \geq \theta m] \leq 2\cdot e^{-2\theta^2 \cdot n \cdot \left(\frac{e^\varepsilon-1}{e^\varepsilon+1}\right)^2}, \quad (10)$$

which concludes the proof.
Proof.
[Proof of Theorem 1] For any $\delta \in [0,1]$, set $$\delta = 2\cdot e^{-2\theta^2 \cdot n \cdot \left(\frac{e^\varepsilon-1}{e^\varepsilon+1}\right)^2}.$$

Then, error $$\theta m = \leq \frac{m}{\sqrt{2n}} \cdot \frac{e^\varepsilon+1}{e^\varepsilon-1} \cdot \sqrt{\log\frac{2}{\delta}}.$$

This fact combined with Lemmas (2,4) complete the proof.

2.2 d-Bit Mechanism for Histogram Estimation

Now consider the problem of estimating histograms of counter values in a discretized domain with k buckets with LDP to be guaranteed.

In order to have a smooth trade-off between accuracy and communication cost (as well as the ability to protect privacy in repeated data collection, which will be introduced in Section 3), in some examples, the facility uses a randomized response mechanism using subsampling by buckets. Some aspects of this "histogram estimation" approach are based on J. C. Duchi, M. J. Wainwright, and M. I. Jordan, Local privacy and minimax bounds: Sharp rates for probability estimation, in *NIPS*, pages 1529-1537, 2013.

Collection Mechanism dBitFlip: Each user i (that is, the computing device operating on behalf of user i) randomly draws d bucket numbers without replacement from [k], denoted by $j_1, j_2, \ldots, j_d$. When the collection of discretized bucket number $v_i(t) \in [k]$ at time t is requested by the data collector, each user i sends a vector:

$$b_i(t) = [(j_1, b_{i,j_1}(t)), (j_2, b_{i,j_2}(t)), \ldots, (j_d, b_{i,j_d}(t))],$$

where $$b_{i,j_p}(t)$$

is a random 0-1 bit,
with $$Pr[b_{i,j_p}(t)=1] = \begin{cases} e^{\varepsilon/2}/(e^{\varepsilon/2}+1) & \text{if } v_i(t)=j_p \\ 1/(e^{\varepsilon/2}+1) & \text{if } v_i(t)\neq j_p \end{cases},$$

for $p = 1, 2, \ldots, d$.

Under the public coin model, each user i only needs to send to the data collector d bits $$b_{i,j_1}(t), b_{i,j_2}(t), \ldots, b_{i,j_d}(t)$$

in $b_i(t)$, as $j_1, j_2, \ldots, j_d$ can be generated using public coins.
Histogram Estimation.
Data collector estimates histogram $h_t$ as: for $v \in k$, $$\hat h_t(v) = \frac{k}{nd} \sum_{b_{i,v}(t) \text{ is received}} \frac{b_{i,v}(t)\cdot(e^{\varepsilon/2}+1)-1}{e^{\varepsilon/2}-1} \quad (11)$$

The privacy guarantee is straightforward. In terms of the accuracy, the intuition is that for each bucket $v \in [k]$, there are roughly nd/k users each responding with a 0-1 bit $b_{i,v}(t)$. The following result can be proven.

Theorem 2.

For single-round data collection, the mechanism dBitFlip preserves $\varepsilon$-LDP for each user. Upon receiving the d bits $$\{b_{i,j_p}(t)\}_{p\in[d]}$$

from each user i, the data collector can then estimate then histogram $h_t$ as $\hat h_t$ in (11). With probability at least $1-\delta$, we have, $$\max_{v \in [k]} |h_t(v) - \hat{h}_t(v)| \leq \sqrt{\frac{5k}{nd}} \cdot \frac{e^{\varepsilon/2}+1}{e^{\varepsilon/2}-1} \cdot \sqrt{\log \frac{6k}{\delta}} \leq O\left(\sqrt{\frac{k \log(k/\delta)}{\varepsilon^2 nd}}\right).$$

2.2A Proof of Theorem 2

The privacy guarantee ε-LDP is straightforward from the construction. To analyze the error bound $|h_t(v)-\hat{h}_t(v)|$ for each $v \in [k]$, consider the set of users $U(v)$ each of whom sends $(v, b_{i,v}(t))$ to the data collector. Let $n_v = |U(v)|$, and based on how each user chooses $j_1, \ldots, j_d$, $$n_v = \frac{k}{nd}$$

is known in expectation. Consider $$h'_t(v) = \frac{1}{n_v} \cdot |\{i : v_i(t) = v$$

and $i \in U(v)\}|$: since $U(v)$ can be considered as a uniform random sample from $[n]$, it can be shown that, Hoeffding's inequality, $$|h_t(v) - h'_t(v)| \leq O\left(\sqrt{\frac{k \log(1/\delta)}{nd}}\right)$$

with probability at least $1-\delta/2$
From (11) and, again, Hoeffding's inequality, $$|h'_t(v) - \hat{h}_t(v)| \leq O\left(\sqrt{\frac{k \log(1/\delta)}{\varepsilon^2 nd}}\right)$$

with probability at least $1-\delta/2$
Combining these using the union bound of probability and trangle inequality produces $$|h_t(v) - \hat{h}_t(v)| \leq O\left(\sqrt{\frac{k \log(1/\delta)}{\varepsilon^2 nd}}\right)$$

with probability at least $1-\delta$
The bound of the max error $\max_{v \in [k]} |ht(v) - \hat{h}t(v)|$ follows from union bound over the k buckets.

3. Memoization for Continual Collection of Counter Data

One important concern regarding the use of ε-LDP algorithms (e.g., in Section 2.1) to collect counter data pertains to privacy leakage that may occur if user's data is collected repeatedly (say, daily) and user's private value $x_i$ does not change or changes little. Depending on the value of ε, after a number of rounds, data collector will have enough noisy reads to estimate $x_i$ with high accuracy.

Memoization is a simple rule that says that: At the account setup phase each user pre-computes and stores his responses to data collector for all possible values of the private counter. At data collection users do not use fresh randomness, but respond with pre-computed responses corresponding to their current counter values. To a certain degree, memoization takes care of situations when the private value $x_i$ stays constant. Note that the use of memoization can in some cases violate differential privacy. If memoization is employed, data collector can easily distinguish a user whose value keeps changing from a user whose value is constant, no matter how small s is. However, privacy leakage is limited: when data collector observes that user's response had changed, this only indicates that user's value had changed, but not what it was and not what it has changed to.

As observed in Section 1.3, using memoization technique in the context of collecting counter data can be problematic for the following reason: often, from day to day, private values $x_i$ do not stay constant, but rather experience small changes (e.g., one can think of app usage statistics reported in seconds). Note that naively using memoization adds no additional protection to the user whose private value varies but stays approximately the same, as data collector would observe many independent responses corresponding to it.

One way to address the issue above is to use discretization: pick a large integer (segment size) s that divides m; consider the partition of all integers into segments $[ls, (l+1)s]$; and have each user report his value after rounding the true value $x_i$ to the mid-point of the segment that $x_i$ belongs to. This approach takes care of the issue of leakage caused by small changes to $x_i$ as users values would now tend to stay within a single segment, and thus trigger the same memorized response; however accuracy loss may be extremely large. For instance, in a population where all $x_i$ are $ls+1$ for some l, after rounding every user would be responding based on the value $ls+s/2$ Subsection 3.1 describes a different, randomized rounding technique (termed α-point rounding) that rigorously addresses the issues discussed above. We first consider the mean estimation problem.

3.1 a-Point Rounding for Mean Estimation

Rounding seeks to discretize the domain where users' counters take their values. Discretization reduces domain size, and users that behave consistently take fewer different values, which allows the use of memoization to get a strong privacy guarantee.

Discretization may be particularly detrimental to accuracy when users' private values are correlated. In some examples, the facility addresses this issue by making the discretization rule independent across different users. This ensures that when all users have the same value, some users round it up and some round it down, facilitating a smaller accuracy loss.

In some examples, the facility extends the basic algorithm 1 BitMean and employs both α-point rounding and memoization. For counter values that range in $[0, m]$.

1. At the algorithm design phase, we specify an integer s (our discretization granularity). We assume that s divides m. In some examples, the facility sets s rather large compared to m, say $s=m/20$ or even $s=m$ depending on the particular application domain.
2. At the setup phase, each user $i \in [n]$ (that is, the computing device operating on behalf of user i) independently at random picks a value $\alpha_i \in \{0, \ldots, s-1\}$, that is used to specify the rounding rule.
3. User i invokes the basic algorithm 1 BitMean with range m to compute and memorize 1-bit responses to data collector for all $\frac{m}{s}+1$ values $x_i$ in the arithmetic progression $$A = \{ls\}_{0 \le l \le \frac{m}{s}}. \quad (12)$$

4. Consider a user i with private value $x_i$ who receives a data collection request. Let $x_i \in [L,R)$, where L,R are the two neighboring elements of the arithmetic progression $$\{ls\}_{0 \le l \le \frac{m}{s}+1}.$$

The user $x_i$ rounds value to L if $x_i + \alpha_i < R$; otherwise, the user rounds the values to R. Let $y_i$ denote the value of the user after rounding. In each round, user responds with the memorized bit for value $y_i$. Note that rounding is always uniquely defined.

We now establish the properties of the algorithm above.

Lemma 1.

Define $$\sigma' := \frac{1}{n}\sum_i y_i.$$

Then, $E[\sigma'] = \sigma$, where $\sigma$ is defined by (7).

Proof.

Let $a = x_i - L$ and $b = R - x_i$. Define a random variable $z_i$ as follows. Let $z_i = b$ with probability $a/(a+b)$ and $z_i = -a$ with probability $b/(a+b)$. Then, $E[z_i] = 0$. Random variable $y_i$ can be rewritten as $y_i = x_i + z_i$. The proof the lemma follows from the linearity of expectation and the fact that $E[z_i] = 0$.

Perhaps a bit surprisingly, using $\alpha$-point rounding does not lead to additional accuracy losses independent of the choice of discretization granularity s.

Theorem 3.

Independent of the value of discretization granularity s, at any round of data collection, the algorithm above provides the same accuracy guarantees as given in Theorem 1.

Proof.

It suffices to show that independent of the $s_i$ each output bit $b_i$ is still sampled according to the distribution given by formula (2). We use the notation of Lemma 1. By formula (2) and the definition of $b_i$ we have:

$$Pr[b_i = 1] = \frac{b}{a+b}\left(\frac{1}{e^\varepsilon+1} + \frac{L}{m} \cdot \frac{e^\varepsilon-1}{e^\varepsilon+1}\right) + \frac{b}{a+b}\left(\frac{1}{e^\varepsilon+1} + \frac{R}{m} \cdot \frac{e^\varepsilon-1}{e^\varepsilon+1}\right)$$

$$= \frac{1}{e^\varepsilon+1} + \left(\frac{b}{a+b} \cdot \frac{L}{m} + \frac{a}{a+b} \cdot \frac{R}{m}\right) \cdot \left(\frac{e^\varepsilon-1}{e^\varepsilon+1}\right)$$

$$= \frac{1}{e^\varepsilon+1} + \frac{1}{m} \cdot \left(\frac{b(x_i-a)+a(x_i+b)}{a+b}\right) \cdot \left(\frac{e^\varepsilon-1}{e^\varepsilon+1}\right)$$

$$= \frac{1}{e^\varepsilon+1} + \frac{x_i}{m} \cdot \frac{e^\varepsilon-1}{e^\varepsilon+1},$$

which concludes the proof.

3.2 Privacy Definition Using Permanent Memoization

In what follows we detail privacy guarantees provided by the facility where employing $\alpha$-point rounding and memoization in conjunction with the $\varepsilon$-DP 1-bit mechanism of Section 2.1 against a data collector that receives a very long stream of user's responses to data collection events.

Let U be a user and x(1), x(T) be the sequence of U's private counter values.

Given user's private value $\alpha_i$, each of $\{x(j)\}_{j \in [T]}$ gets rounded to the corresponding value $\{y(j)\}_{j \in [T]}$ in the set A (defined by (4)) according to the rule given in Section 3.1.

Definition 2.

Let B be the space of all sequences $\{z(j)\}_{j \in [T]} \subseteq A^p$, considered up to an arbitrary permutation of the elements of A. We define the behavior pattern b(u) of the user U to be the element of B corresponding to $\{y(j)\}_{j \in [T]}$. We refer to the number of distinct elements y(j) in the sequence $\{y(j)\}_{j \in [T]}$ as the width of b(U).

We now discuss our notion of behavior pattern, using counters that carry daily app usage statistics as an example. Intuitively, users map to the same behavior pattern if they have the same number of different modes (approximate counter values) of using the app, and switch between these modes on the same days. For instance, one user that uses an app for 30 minutes on weekdays, 2 hours on weekends, and 6 hours on holidays, and the other user who uses the app for 4 hours on weekdays, 10 minutes on weekends, and does not use it on holidays will likely map to the same behavior pattern. Because the mapping from actual private counter values $\{x(j)\}$ to behavior patterns is randomized, though, there is a likelihood that some users with identical private usage profiles may map to different behavior patterns. This is a positive feature of Definition 2 that increases entropy among users with the same behavior pattern.

Theorem 4 below shows that the algorithm of Section 3.1 makes users with the same behavior pattern blend with each other from the viewpoint of data collector (in the sense of differential privacy).

Theorem 4.

Consider users U and V with sequences of private counter values $\{x_U(1), \ldots, x_U(T)\}$ and $\{x_V(1), \ldots, x_V(T)\}$. Assume that both U and V respond to T data collection events using the algorithm presented in Section 3.1, and b(U)=b(V) with the width of b(U) equal to w. Let $s_U, s_V \in \{0,1\}^T$ be the random sequences of responses generated by users U and V; then for any binary string $s \in \{0,1\}^T$ in the response domain, we have:

$$Pr[s_U=s] \le e^{w\varepsilon} Pr[s_V=s]. \quad (13)$$

Proof.

Let $\{y_U(1), \ldots, y_U(T)\}$ and $\{y_V(1), \ldots, y_V(T)\}$ be the sequences of U's and V's counter values after applying $\alpha$-point rounding. Since the width of b(U) is w, the set $\{y_U(j)\}_{j \in [T]}$ contains w elements $\{y_U(j_1), \ldots, y_U(j_w)\}$. Similarly, the set $\{y_V(j)\}_{j \in [T]}$ contains w elements $\{y_V(j_1), \ldots, y_V(j_w)\}$. Note that vectors $s_U$ and $s_V$ are each determined by w bits that are U's (V's) memorized responses based corresponding to counter values $\{y_U(j_s)\}_{s \in [w]}$ and $\{y_V(j_s)\}_{s \in [w]}$. By the $\varepsilon$-LDP property of the basic algorithm 1 BitMean of Section 2.1 for all values of y,y'∈ $[0, \ldots, m]$ and all $b \in \{0,1\}$, we have $$Pr[1\text{BitMean}(y)=b] \le e^\varepsilon \cdot Pr[1\text{BitMean}(y')=b].$$

Thus the probability of observing some specific w responses of A can increase by at most $e^{w\varepsilon}$ as we vary the inputs.

3.2.1 Setting Parameters

The $\varepsilon$-LDP guarantee provided by Theorem 4 ensures that each user is indistinguishable from other users with the same behavior pattern (in the sense of LDP). The exact shape of behavior patterns is governed by the choice of the parameter s. Setting s very large, say s=m or s=/2 reduces the number of possible behavior patterns and thus increases the number of users that blend by mapping to a particular behavior pattern. It also yields stronger guarantee for blending within a pattern since for all users U we necessarily have b(U)≤m/s+1 and thus by Theorem 4 the likelihood of distinguishing users within a pattern is trivially at most $e^{(m/s+1)-\varepsilon}$. At the same time, there are cases where one can justify using smaller values of s. In fact, consistent users, i.e., users whose private counter always land in the vicinity of one of a small number of fixed values enjoy a strong LDP guarantee within their patterns irrespective of s (provided it is not too small), and smaller s may be advantageous to avoid certain attacks based on auxiliary information as the set of all possible values of a private counter $x_i$ that lead to a specific output bit b is potentially more complex.

The $\varepsilon$-LDP guarantee established in Theorem 4 is not a panacea, however, and in particular it is a weaker guarantee (provided in a much more challenging setting) than just the $\varepsilon$-LDP guarantee across all users that we provide for a single round of data collection. In particular, while LDP across all population of users is resilient to any attack based on auxiliary information, LDP across a sub population may be vulnerable to such attacks and therefore be a candidate for additional levels of protection. In particular, if data collector observes that user's response has changed; data collector knows with certainty that user's true counter value had changed. In the case of app usage telemetry, this implies that app has been used on one of the days. This attack is mitigated by the output perturbation technique that is discussed in Section 4.

3.2.2 Experimental Study

We performed an experimental study using, for each of 3 million users, the user's daily usage of two apps (App A and B) collected (in seconds) over a continuous period of 31 days to demonstrate the mapping of users to behavior patterns. For each behavior pattern (Definition 2), we calculate its support as the number of users with their sequences in this pattern (y-axis). We vary the parameter s in permanent memoization from m (maximizing blending) to m/3 and report the corresponding distributions of pattern supports.

For every behavior pattern there is a very large set of sequences of private counter values $\{x(t)\}_t$ that may map to it (depending on $\alpha_i$). Users tend to be approximately consistent and therefore simpler patterns, i.e., patterns that mostly stick to a single rounded value y(t)=y correspond to larger sets of sequences $\{x_i(t)\}_t$, obtained from a real population. In particular, for each app there is always one pattern (corresponding to having one fixed y(t)=y across all 31 days) which blends the majority of users (>2 million). However, more complex behavior patterns have less users mapping to them. In particular, there always are some lonely users (1%-5% depending on s) who land in patterns that have support size of one or two. From the viewpoint of data collector such users can only be identified as those having a complex and irregular behavior, however the actual nature of that behavior by Theorem 4 remains uncertain.

3.3 Example

One specific example of counter collection problem that has been identified as being non-suitable but can be easily solved using our methods is to repeatedly collect age in days from a population of users. When we set s=m and apply the one-bit mean collection and estimation algorithm described above, we can collect such data for T rounds with high accuracy. Each user necessarily responds with a sequence of bits that has form $z^t \circ \bar{z}^{T-t}$, where 0≤t≤T. Thus data collector only gets to learn the transition point, i.e., the day when user's age in days passes the value m−$\alpha_i$, which is safe from privacy perspective as $\alpha_i$ is picked uniformly at random by the user.

3.4 Continual Collection for Histogram Estimation Using Permanent Memoization Since the facility discretizes the range of values and map each users value to a small number of k buckets, $\alpha$-point rounding is not needed for histogram estimation. Typical single-round LDP mechanisms send out a 0-1 random response for each bucket: send 1 with probability $e^{\varepsilon/2}/(e^{\varepsilon/2}+1)$ if the counter value is in this bucket, with probability $1/(e^{\varepsilon/2}+1)$ if not. This mechanism is $\varepsilon$-LDP. Each user can memorize a mapping $f_k$: $[k] \to \{0,1\}^k$ by running this mechanism once for each v∈[k], and always respond $f_k(v)$ if the users' value is in bucket v. However, this memoization schema leads to very serious privacy leakage. There is a situation where one has auxiliary information that can deterministically correlate a user's value with the output $z \in \{0,1\}^k$ produced by the algorithm: more concretely, if the data collector knows that the app usage value is in a bucket v and observes the output z in some day, whenever the user sends z again in future, the data collector can infer that the bucket number is v with almost 100% probability.

To avoid such privacy leakages, in some examples the facility applies permanent memoization on our d-bit mechanism d BitFlip (Section 2.2). Each user runs d BitFlip once for each bucket number v∈[k] and memorizes the response in a mapping $f_d$: $\{0,1\}^d$. The user will always send $f_d(v)$ if the bucket number is v. This is mechanism is denoted by d BitFlipPM, and the same estimator (3) can be used to estimate the histogram upon receiving the d-bit response from every user. This scheme avoids several privacy leakages that arise due to memoization, because multiple ($\Omega(k/2^d)$ w.h.p.) buckets are mapped to the same response. This protection is the strongest when d=1. Definition 2 about behavior patterns and Theorem 4 can be generalized here to provide similar privacy guarantee in repeated data collection.

4. Output Perturbation

One of the limitations of memoization approach is that it does not protect the points of time where a user's behavior changes significantly. Consider a user who doesn't use an app for a long time, and then starts using it. When this happens, suppose the output produced by our algorithm changes from 0→1. Then the data collector can learn with certainty that the user's behavior changed, (but not what this behavior was or what it became). Output perturbation is one possible mechanism of protecting the exact location of the points of time where user's behavior has changed. As mentioned earlier, output perturbation is sometimes used as a way to mitigate privacy leakage that arises due to memoization. The main idea behind output perturbation is to flip the output of memorized responses with a small probability $0 \leq \gamma \leq 1$. This ensures that data collector will not be able to learn with certainty that behavior of a user changed at certain time stamps. Suppose $b_i(t)$ denote the memorized response bit for user i at time t. Then, $$\hat{b}_i(t) = \begin{cases} b_i(t), & \text{with probability } 1 - \gamma; \\ 1 - b_i(t), & \text{otherwise.} \end{cases} \quad (14)$$

Note that output perturbation is done at each time step t on the memorized responses. For any arbitrary $T>0$, fix a time horizon $[1, 2, \ldots T]$ where the counter data is collected. Let z and z' be two vectors in $[m]^T$. Let $H(z)$ and $H(z')$ denote the output produced by our 1-bit algorithm+Memoization+output perturbation, where z and z' see the same memorized responses but see different randomness in the output perturbation step. Suppose the Hamming-distance between z and z' is at most S. Then, Theorem 5.

Let S be a vector in $\{0,1\}^T$. Then, $$\frac{P[A'(x) = S]}{P[A'(x') = S]} \geq \gamma^\delta.$$

Recall that in the output perturbation step, we flip each output bit $A(x(t))$ independently with probability $\gamma$. This implies, $$\frac{P[A'(x) = S]}{P[A'(x') = S]} = \prod_{t=1}^{T} \frac{P[A'(x(t)) = S(t)]}{P[A'(x'(t)) = S(t)]},$$

where $S(t) \in \{0,1\}$ denotes the value of S at the t th coordinate. For a $t \in [T]$ for which $A(x(t)) = A(x'(t))$, we have $$\frac{P[A'(x(t)) = S(t)]}{P[A'(x'(t)) = S(t)]} = 1;$$

this is true, since the probability used to flip the output bits is same for both the strings. Therefore, $$\frac{P[A'(x) = S]}{P[A'(x') = S]} = \prod_{t:t \in [T], A(x(t)) \neq A(x'(t))} \frac{P[A'(x(t)) = S(t)]}{P[A'(x'(t)) = S(t)]}. \quad (15)$$

Now notice that for a $t \in [T]$ for which $A(x(t)) \neq A(x'(t))$, we have $$\frac{P[A'(x(t)) = S(t)]}{P[A'(x'(t)) = S(t)]} \geq \gamma.$$

Thus, the lemma follows from Eq. (15) and from our assumption that $|\{t: t \in [T], A(x(t)) \neq A(x'(t))\}| \leq \delta$.

The theorem implies that if the user behavior changed at time t, then there is an interval of time $[t-\delta, t+\delta]$ where the data collector would not be able to differentiate if the user behavior changed at time t or any other time $t' \in [t-\delta, t+\delta]$. Consider a user i and let $x_i$ be a vector in $[m]^T$ that denotes the values taken by i in the interval $[1, 2, \ldots, T]$. Suppose the user's behavior remains constant up to time step t, and it changes at time t, and then remains constant. Without loss of generality, let us assume that $x_i(t')=a$ for all $t'<t$, and $x_i(t')=b$ for all $t' \geq t$. Consider the case when the output produced by our memoization changes at time t; that is, using the notation from above paragraph $A(x_i(a)) \neq A(x_i(b))$. Without output perturbation, the data collector will be certain that user's value changed at time t. With output perturbation, we claim that the data collector would not be able to differentiate if the user's behavior changed at time t or any other time $t' \in [t-\delta, t+\delta]$, if $\delta$ is sufficiently small. (Think of $\delta$ as some small constant.) Consider another pattern of user's behavior $x_i' \in [m]^T$, $x_i'(t')=a$ for all $t'<t^*$ and $x_i'(t')=b$ for all $t' \geq t^*$. Further, if $t^* \in [t-\delta, t+\delta]$, then $$\frac{P[A'(x_i) = S]}{P[A'(x_i') = S]} \geq \gamma^\delta.$$

This is true because of the following reason. Consider the case $t^* \geq t$. Then, in the interval $[t, t+\delta]$, the output of 1-bit mechanism+memoization can be different from the strings $x_i, x_i'$. However, Hamming distance of $A(x_i)$ and $A(x_i')$ is at most $\delta$. Thus, we conclude from Theorem 5 that $$\frac{P[A'(x_i) = S]}{P[A'(x_i') = S]} \geq \gamma^\delta.$$

The argument for the case $t^*<t$ is exactly the same. Thus, output perturbation can help to protect learning exact points of time where the users' behavior changes.

We also establish following properties for our algorithm.

Theorem 6.

The algorithm presented above is ln $$\left( \frac{(1-2\gamma)\left(\frac{e^\epsilon}{e^\epsilon+1}\right) + \gamma}{(1-2\gamma)\left(\frac{1}{e^\epsilon+1}\right) + \gamma} \right).$$

Furthermore, for each round t of data collection, with probability at least $(1-\delta)$ the error of mechanism presented above is at most $$\left( m \cdot \frac{e^\epsilon + 1}{(1-2\gamma)(e^\epsilon - 1)} \cdot \sqrt{\frac{1}{2n} \cdot \log \frac{2}{\delta}} \right),$$

where $\delta$ is an arbitrary constant in $[0,1]$.

4.1 Proof of Theorem 6

To prove Theorem 6 we observe that the distribution produced by output perturbation equivalent to 1 BitMean algorithm without the output perturbation but with the following modification:

$$b_i(t) = \begin{cases} 1, & \text{with probability } (1-2\gamma)\left(\frac{1}{e^\varepsilon+1} + \frac{x_i(t)}{m} \cdot \frac{e^\varepsilon-1}{e^\varepsilon+1}\right) + \gamma; \\ 0, & \text{otherwise.} \end{cases} \quad (16)$$

Data collector obtains the values $\{b_i(t)\}_{i \in [n]}$ and outputs $$\hat{\sigma}(t) = \left(\sum_{i \in [n]} b_i(t) - \frac{(1-2\gamma)n}{e^\varepsilon+1} - \gamma n\right) \cdot \frac{e^\varepsilon+1}{e^\varepsilon-1} \cdot \frac{m}{n} \cdot \frac{1}{1-2\gamma}. \quad (17)$$

Now to prove Theorem 6, we simply invoke Theorem 1.

5. Empirical Evaluation

We compare our mechanisms (with permanent memoization) for mean and histogram estimation with previous mechanisms for one-time data collection. Note that all the mechanisms we compare here provide one-time ε-LDP guarantee; however, our mechanisms provide additional protection for each individual's privacy during the repeated data collection (as introduced in Sections 3-4). These experiments show that our mechanisms, with such additional protection, are no worse than or comparable to the state-of-the-art LDP mechanisms in terms of estimation accuracy. The dataset we use is the same as the one described in Section 3.2.2.

Mean Estimation.

We implement our 1-bit mechanism (introduced in Section 2.1) with α-point Randomized Rounding and Permanent Memoization for repeated collection (Section 3), denoted by 1 BitRRPM, and output perturbation to enhance the protection for usage change (Section 4), denoted by 1 BitRRPM+OP(γ). We compare it with the Laplace mechanism for LDP mean estimation, denoted by Laplace. We vary the value of ε(ε=0.1-10) and the number of users (n=0.1, 0.3, 3×10⁶ by randomly picking subsets of all the 3 million users), and run all the mechanisms 3000 times on the 31-day usage data with three counters. Recall that the domain size is m=24 hours. In the average of absolute errors (in seconds) with one-standard deviation (one-STD)m 1 BitRRPM is consistently better than Laplace with smaller errors and narrower STDs. Even with a perturbation probability γ=¹⁄₁₀, they are comparable in accuracy. When γ=⅓, output perturbation is equivalent to adding an additional uniform noise from [0, 24 hours] independently on each day to provide very strong protection on usage change—even in this case, 1 BitRRPM+OP(⅓) gives us tolerable accuracy when the number of users is large.

Histogram Estimation.

We create k=32 buckets on [0, 24 hours] with even widths to evaluate mechanisms for histogram estimation. We implement our d-bit mechanism (Section 2.2) with permanent memoization for repeated collection (Section 3.4), denoted by d BitFlipPM. In order to provide protection on usage change in repeated collection, we use d=1, 2, 4 (strongest when d=1). We compare it with state-of-the-art one-time mechanisms for histogram estimation: BinFlip [8, 9], KFlip [22], and BinFlip+ [3]. When d=k, d BitFlipPM has the same accuracy as BinFlip. KFlip is sub-optimal for small ε [22] but has better performance when ε is Ω(ln k). In contrast, BinFlip+ has good performance when ε≤2. We repeat the experiment 3000 times, and average histogram error (maximum error across all bars in a histogram) with one-STD for different algorithms with ε=0.1-10 and n=0.3, 3×10⁶ confirms the above theoretical results. BinFlip (equivalently, 32 BitFlipPM) has the best accuracy overall. With enhanced privacy protection in repeated data collection, 4 bitFlipPM-1 bitFlipPM are comparable or even better than one-time collection mechanisms KFlip (when s is small) and BinFlip+ (when ε is large).

In some examples, the facility provides a method in a computing system for reporting on one or more original values on behalf of each of a plurality of users, each original value falling within a domain partitioned into a plurality of segments of uniform size, the method comprising: for each of the plurality of users, randomly selecting an upward-rounding window size that is smaller than the segment size; for each of the plurality of users, for each source value in a domain, randomly determining a mapping of each segment of the domain to a segment identifier value; for each of the plurality of users, determining a first original value for the user; adding the upward-rounding window size to the first original value determined for the user to obtain a first window-augmented original value; identifying a first segment containing the first window-augmented original value; using the determined mapping to identify a first segment identifier value mapped-to from the first identified segment; and transmitting a first reporting communication on behalf of the user that reports a value based at least in part on the identified first segment identifier value.

In some examples, the facility provides one or more memories collectively having contents configured to cause a computing system to perform a method for reporting on one or more original values on behalf of each of a plurality of users, each original value falling within a domain partitioned into a plurality of segments of uniform size, the method comprising: for each of the plurality of users, randomly selecting an upward-rounding window size that is smaller than the segment size; for each of the plurality of users, for each source value in a domain, randomly determining a mapping of each segment of the domain to a segment identifier value; for each of the plurality of users, determining a first original value for the user; adding the upward-rounding window size to the first original value determined for the user to obtain a first window-augmented original value; identifying a first segment containing the first window-augmented original value; using the determined mapping to identify a first segment identifier value mapped-to from the first identified segment; and transmitting a first reporting communication on behalf of the user that reports a value based at least in part on the identified first segment identifier value.

In some examples, the facility provides a computing system for reporting on one or more original values on behalf of each of a plurality of users, each original value falling within a domain partitioned into a plurality of segments of uniform size, the computing system comprising: a processor; and a memory having contents that are executable by the processor to perform a method, the method comprising: for each of the plurality of users, randomly selecting an upward-rounding window size that is smaller than the segment size; for each of the plurality of users, for each source value in a domain, randomly determining a mapping of each segment of the domain to a segment identifier value; for each of the plurality of users, determining a first original value for the user; adding the upward-rounding window size to the first original value determined for the user to obtain a first window-augmented original value; identifying a first segment containing the first window-augmented original value; using the determined mapping to identify a first segment identifier value mapped-to from the first identified segment;

and transmitting a first reporting communication on behalf of the user that reports a value based at least in part on the identified first segment identifier value.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A computing device implemented method comprising:
obtain partition information for a domain into which original values obtained from a user device fall, the partition information partitioning the domain into a plurality of segments of uniform size;
randomly selecting for the user device an upward-rounding window having a window size smaller than the segment size, the upward-rounding window size is added to each original value determined for the user device;
randomly determining a mapping of each segment of the domain to a segment identifier value;
determining a first original value for the user device, wherein the first original value represents a first private value falling within the domain and which describes an operation of the user device;
adding the upward-rounding window size selected for the user device to the first original value to obtain a first window-augmented original value;
identifying a first segment containing the first window-augmented original value;
using the determined mapping to identify a first segment identifier value mapped-to from the first identified segment;
determining a first privacy-preserving value based at least in part on the identified first segment identifier value, wherein the first privacy-preserving value does not include private information associated with the user device; and
transmitting, to a remote computing device, a first reporting communication on behalf of the user device, the first reporting communication reporting the first privacy-preserving value.

2. The method of claim 1 wherein the original value determined for the user device is a value measuring how much time within a distinguished time period an application executed, an application received input, or output generated by an application was displayed on the user device.

3. The method of claim 1 wherein the reporting communication reports the identified segment identifier value as the first privacy-preserving value associated with the user device.

4. The method of claim 1, further comprising:
randomly selecting a value in a range, wherein the value randomly selected for the user device is within a perturbation subrange of the range;
based at least in part on the value randomly selected for the user device is within a perturbation subrange of the range, perturbing the segment identifier value identified for the user device,
and wherein the first privacy-preserving value reported by the reporting communication transmitted on behalf of the user device is the perturbed segment identifier.

5. The method of claim 1 wherein the random selection of an upward-rounding window size is within a uniform probability across a range between zero and one fewer than the segment size.

6. The method of claim 1, further comprising:
receiving, at the remote computing device, reporting communications for a plurality of user devices;
applying an aggregation function to aggregate the values reported by the received reporting communications to obtain an aggregation result; and
storing aggregation results on behalf of the plurality of user devices collectively.

7. The method of claim 1, further comprising:
determining a second original value for the user device, wherein the second original value represents a second private value falling within the domain and describes the operation of the user device;
adding the upward-rounding window size to the second original value determined for the user to obtain a second window-augmented original value;
identifying a second segment containing the second window-augmented original value;
using the determined mapping to identify a second segment identifier value mapped-to from the second identified segment;
determining a second privacy-preserving value based at least in part on the identified second segment identifier value, wherein the second privacy-preserving value does not include private information associated with the user device; and
transmitting, to the remote computing device, a second reporting communication on behalf of the user device, the second reporting communication reporting the first privacy-preserving value.

8. One or more memories collectively having contents configured to cause a computing system to perform a method comprising:
obtain partition information for a domain into which original values obtained from a user device fall, the partition information partitioning the domain into a plurality of segments of uniform size;
randomly selecting for the user device an upward-rounding window having a window size smaller than the segment size, the upward-rounding window size is added to each original value determined for the user device;
randomly determining a mapping of each segment of the domain to a segment identifier value;
determining a first original value for the user device, wherein the first original value represents a first private value falling within the domain and which describes an operation of the user device;
adding the upward-rounding window size to the first original value determined for the user device to obtain a first window-augmented original value;
identifying a first segment containing the first window-augmented original value;
using the determined mapping to identify a first segment identifier value mapped-to from the first identified segment;
determining a first privacy-preserving value based at least in part on the identified first segment identifier value, wherein the first privacy-preserving value does not include private information associated with the user; and
transmitting, to a remote computing device, a first reporting communication on behalf of the user device, the first reporting communication reporting the first privacy-preserving value to the remote device.

9. The one or more memories of claim 8 wherein the reporting communication reports the identified segment identifier value as the first privacy-preserving value associated with the user device.

10. The one or more memories of claim 8, the method further comprising:
randomly selecting a value in a range, wherein the value randomly selected for the user device is within a perturbation subrange of the range;
based at least in part on the value randomly selected for the user device is within a perturbation subrange of the range, perturbing the segment identifier value identified for the user device,
and wherein the first privacy-preserving value reported by the reporting communication transmitted on behalf of the user device is the perturbed segment identifier.

11. The one or more memories of claim 8, the method further comprising:
receiving, at the remote computing device, reporting communications for a plurality of user devices;
applying an aggregation function to aggregate the values reported by the received reporting communications two obtain an aggregation result; and
storing aggregation results on behalf of the plurality of the plurality of user devices collectively.

12. The one or more memories of claim 8, the method further comprising:
determining a second original value for the user device, wherein the second original value represents a second private value falling within the domain and describes the operation of the user device;
adding the upward-rounding window size to the second original value determined for the user to obtain a second window-augmented original value;
identifying a second segment containing the second window-augmented original value;
using the determined mapping to identify a second segment identifier value mapped-to from the second identified segment;
determining a second privacy-preserving value based at least in part on the identified second segment identifier value, wherein the second privacy-preserving value does not include private information associated with the user device; and
transmitting, to the remote computing device, a second reporting communication on behalf of the user device, the second reporting communication reporting the first privacy-preserving value to the remote computing device.

13. A computing system comprising:
a processor; and
a memory having contents executable by the processor to perform a method, the method comprising:
obtain partition information for a domain into which original values obtained from a user device fall, the partition information partitioning the domain into a plurality of segments of uniform size;
randomly selecting for the user device an upward-rounding window having a window size smaller than the segment size, the upward-rounding window size is added to each original value determined for the user device;
randomly determining a mapping of each segment of the domain to a segment identifier value;
determining a first original value for the user device, wherein the first original value represents a first private value falling within the domain and which describes an operation the user device;
adding the upward-rounding window size selected for the user device to the first original value to obtain a first window-augmented original value;
identifying a first segment containing the first window-augmented original value;
using the determined mapping to identify a first segment identifier value mapped-to from the first identified segment;
determining a first privacy-preserving value based at least in part on the identified first segment identifier value, wherein the first privacy-preserving value does not include private information associated with the user device; and
transmitting, to a remote computing device, a first reporting communication on behalf of the user device, the first reporting communication reporting the first privacy-preserving value.

14. The computing system of claim 13 wherein the reporting communication reports the identified segment identifier value as the first privacy-preserving value associated with the user device.

15. The computing system of claim 13, the method further comprising:
receiving, at the remote computing device, reporting communications for a plurality of users;
applying an aggregation function to aggregate the values reported by the received reporting communications two obtain an aggregation result; and
storing aggregation results on behalf of the plurality of user devices collectively.

16. The computing system of claim 13, the method further comprising:
determining a second original value for the user device, wherein the second original value represents a second private value falling within the domain and which describes the operation of the user device, the second original value to be transformed into a second privacy-preserving value be reported;
adding the upward-rounding window size to the second original value determined for the user device to obtain a second window-augmented original value;
identifying a second segment containing the second window-augmented original value;
using the determined mapping to identify a second segment identifier value mapped-to from the second identified segment; and
determining a second privacy-preserving value based at least in part on the identified second segment identifier value, wherein the second privacy-preserving value does not include private information associated with the user device; and
transmitting, to the remote computing device, a second reporting communication on behalf of the user device, the second reporting communication reporting the first privacy-preserving value to the remote computing device.

17. A computing device-implemented method comprising:
obtain partition information for a domain into which original values obtained from a user device fall, the partition information partitioning the domain into a plurality of segments of uniform size;
randomly selecting, for the user device, an upward-rounding window having a window size smaller than the uniform size of the plurality of segments, the upward-rounding window size comprising a value added to each original value determined for the user device;

randomly determining, for the user device, a mapping of each of the plurality of the segments of the domain to a segment identifier value;

determining a first original value for the user device, the first original value representing a first private value falling within the domain and which describes the operation of a remote system operated on behalf of the user device;

determining a first privacy-protected value representative of the first original value, wherein the first privacy-protected value does not include private information associated with the user device, wherein determining the first privacy-protected value includes operations of:

adding the upward-rounding window size selected for the user device to the first original value to obtain a first rounded value;

identifying a first segment of the plurality of segments of the domain which the includes first rounded value;

determining a first segment identifier associated with the first segment using the mapping; and determining the privacy-preserving value representative of the first original value based on the first segment identifier; and transmitting a first reporting communication to a remote computing device, the first reporting communication providing the first privacy-preserving value to the remote computing device.

18. The method of claim 17, further comprising:

determining a second original value for the user device, the second original value representing a second private value falling within the domain and describes the operation of the user device;

determining a second privacy-protected value representative of the second original value, wherein the second privacy-protected value does not include private information associated with the user device, wherein determining the second privacy-protected value includes operations of:

adding the upward-rounding window size selected for the user device to the second original value to obtain a second rounded value;

identifying a second segment of the plurality of segments of the domain which the includes second rounded value;

determining a second segment identifier associated with the second segment using the mapping; and determining the privacy-preserving value representative of the second original value based on the second segment identifier; and transmitting a second reporting communication to a remote computing device, the second reporting communication providing the second privacy-preserving value to the remote computing device.

* * * * *